United States Patent
Chen et al.

(10) Patent No.: US 11,679,500 B2
(45) Date of Patent: Jun. 20, 2023

(54) TARGET OBJECT RETRIEVAL

(71) Applicant: Honda Motor Co., Ltd., Tokyo (JP)

(72) Inventors: Yi-Ting Chen, Sunnyvale, CA (US); Yuchen Xiao, Boston, MA (US); Haiming Gang, San Jose, CA (US)

(73) Assignee: HONDA MOTOR CO., LTD., Tokyo (CN)

( * ) Notice: Subject to any disclaimer, the term of this patent is extended or adjusted under 35 U.S.C. 154(b) by 219 days.

(21) Appl. No.: 17/165,790

(22) Filed: Feb. 2, 2021

(65) Prior Publication Data
US 2022/0184806 A1 Jun. 16, 2022

Related U.S. Application Data

(60) Provisional application No. 63/125,119, filed on Dec. 14, 2020.

(51) Int. Cl.
*B25J 9/16* (2006.01)
*B25J 13/08* (2006.01)

(52) U.S. Cl.
CPC ............ *B25J 9/1661* (2013.01); *B25J 9/163* (2013.01); *B25J 9/1612* (2013.01); *B25J 9/1653* (2013.01); *B25J 9/1666* (2013.01); *B25J 9/1697* (2013.01); *B25J 13/088* (2013.01)

(58) Field of Classification Search
CPC ........ B25J 9/1661; B25J 9/1612; B25J 9/163; B25J 9/1653; B25J 9/1666; B25J 9/1697; B25J 13/088
See application file for complete search history.

(56) References Cited

U.S. PATENT DOCUMENTS

| | | | | |
|---|---|---|---|---|
| 2018/0297204 A1* | 10/2018 | Kras | ..................... | B25J 9/163 |
| 2019/0314984 A1* | 10/2019 | Gonzalez Aguirre | ... | B25J 9/163 |
| 2020/0089209 A1* | 3/2020 | Amemiya | .......... | G05B 23/0281 |
| 2020/0143239 A1* | 5/2020 | Simonyan | ................ | G06N 3/08 |
| 2020/0316782 A1* | 10/2020 | Chavez | ..................... | G06T 7/13 |
| 2021/0237270 A1* | 8/2021 | Minoya | .................. | B25J 9/1666 |

OTHER PUBLICATIONS

Danielczuk et al., "Mechanical Search: Multi-Step Retrieval of a Target Object Occluded by Clutter," ICRA, Mar. 4, 2019 (arXiv:1903.01588v1).

(Continued)

*Primary Examiner* — Abby Y Lin
*Assistant Examiner* — Dylan M Katz
(74) *Attorney, Agent, or Firm* — Rankin, Hill & Clark LLP

(57) ABSTRACT

Systems and techniques for target object retrieval may include or utilize an image capture device, and a task planner. The image capture device may receive an image of an environment including identified objects. The task planner may determine potential actions, calculate a probability of success of achieving a desired goal for each of the potential actions based on an action prediction model, the corresponding potential action, a current state of the environment, any previously taken action, and the desired goal, select a potential action associated with the highest calculated probability of success, and simulate a subsequent state based on the selected potential action and a dynamic prediction model. The potential actions may be associated with an identified object of the identified objects and an operation to be performed on the identified object.

19 Claims, 8 Drawing Sheets

(56) References Cited

OTHER PUBLICATIONS

Danielczuk et al., "X-Ray: Mechanical Search for an Occluded Object by Minimizing Support of Learned Occupancy Distributions," IROS, Apr. 20, 2020 (arXiv:2004.09039v1).
Driess et al., "Deep Visual Heuristics: Learning Feasibility of Mixed-Integer Programs for Manipulation Planning," ICRA, 2020.
Driess et al., "Deep Visual Reasoning: Learning to Predict Action Sequences for Task and Motion Planning from an Initial Scene Image," Robotics: Science and Systems, 2020.
Fang et al., Dynamics Learning with Cascaded Variational Inference for Multi-Step Manipulation, CoRL, Mar. 17, 2019 (arXiv:1910.13395v2).
Garrett et al., "Online Replanning in Belief Space for Partially Observable Task and Motion Problems," Mar. 23, 2020 (arXiv:1911.04577v2).
Kurenkov et al., "Visuomotor Mechanical Search: Learning to Retrieve Target Objects in Clutter," 2020 (arXiv:2008.06073v1).
Murali et al., "6-DOF Grasping for Target-driven Object Manipulation in Clutter," May 21, 2020 (arXiv:1912.03628v2).
Novkovic et al., "Object Finding in Cluttered Scenes Using Interactive Perception," ICRA, May 30, 2020 (arXiv:1911.07482v2).
Paxton et al., "Visual Robot Task Planning," Mar. 30, 2018 (arXiv:1804.00062v1).
Xiao et al., "Online planning for target object search in clutter under partial observability," ICRA, 2019.

\* cited by examiner

TARGET OBJECT RETRIEVAL

CROSS-REFERENCE TO RELATED APPLICATIONS

This application claims the benefit of U.S. Provisional Patent Application, Ser. No. 63/125,119 entitled "TARGET OBJECT RETRIEVAL IN CLUTTERED ENVIRONMENT USING INTEGRATIVE TASK AND MOTION PLANNING", filed on Dec. 14, 2020; the entirety of the above-noted application(s) is incorporated by reference herein.

BACKGROUND

While operating in cluttered settings such as warehouse or homes, robotic manipulation tasks are often complicated by the presence of dense clutter that obscures desired objects. The target object is often either not immediately visible or not easily accessible for the robot to grasp. To enable elderly and people with disabilities, assistive devices were invented. However, sometimes the existing user interface of controlling devices, such as wheelchairs or arms, may not be intuitive. Moreover, it may not be easy for users to execute complicated tasks requiring solving multi-step tasks.

For example, for people with disabilities or with multi-impairments, disabled people may utilize assist devices to assist them for their daily lives. For example, they may use a wheelchair to navigate around or they may control an arm using a joystick. However, joysticks and robots arm are different from human manipulation.

BRIEF DESCRIPTION

According to one aspect, a system for target object retrieval may include an image capture device, and a task planner implemented via a processor. The image capture device may receive an image of an environment including one or more identified objects. The task planner may determine one or more potential actions, calculate a probability of success of achieving a desired goal for each of the one or more potential actions based on an action prediction model, the corresponding potential action, a current state of the environment, any previously taken action, and the desired goal, select a potential action associated with the highest calculated probability of success, and simulate a subsequent state based on the selected potential action and a dynamic prediction model. One or more of the potential actions may be associated with an identified object of the one or more identified objects and an operation to be performed on the identified object.

The task planner may perform feasibility checking on the one or more potential actions based on the current state of the environment and perform difference checking between the subsequent state of the environment and the current state of the environment. The system for target object retrieval may include a motion planner implementing the selected potential action and an actuator performing the operation on the identified object. The operation may include pushing, pulling, grasping, or placing the identified object. The task planner may simulate the subsequent state based on the previously taken action. The action prediction model may include a conditional variation auto encoder (CVAE). The action prediction model may be generated based on a causal distribution. The selected potential action may include a location for the identified object to be placed. The processor may identify the one or more objects from the image capture device.

According to one aspect, a robot for target object retrieval may include an image capture device, a task planner implemented via a processor, a motion planner, and an actuator. The image capture device may receive an image of an environment including one or more identified objects. The task planner may determine one or more potential actions, calculate a probability of success of achieving a desired goal for each of the one or more potential actions based on an action prediction model, the corresponding potential action, a current state of the environment, any previously taken action, and the desired goal, select a potential action associated with the highest calculated probability of success, and simulate a subsequent state based on the selected potential action and a dynamic prediction model. The motion planner may implement the selected potential action and the actuator may perform the operation on the identified object. One or more of the potential actions may be associated with an identified object of the one or more identified objects and an operation to be performed on the identified object.

The task planner may perform feasibility checking on the one or more potential actions based on the current state of the environment, perform difference checking between the subsequent state of the environment and the current state of the environment, and simulate the subsequent state based on the previously taken action. The action prediction model may include a conditional variation auto encoder (CVAE) and may be generated based on a causal distribution.

According to one aspect, a method for target object retrieval may include receiving, via an image capture device, an image of an environment including one or more identified objects, determining, via a processor, one or more potential actions, calculating, via the processor, a probability of success of achieving a desired goal for each of the one or more potential actions based on an action prediction model, the corresponding potential action, a current state of the environment, any previously taken action, and the desired goal, selecting, via the processor, a potential action associated with the highest calculated probability of success, and simulating, via the processor, a subsequent state based on the selected potential action and a dynamic prediction model. One or more of the potential actions may be associated with an identified object of the one or more identified objects and an operation to be performed on the identified object.

The method may include performing feasibility checking on the one or more potential actions based on the current state of the environment, performing difference checking between the subsequent state of the environment and the current state of the environment, and/or implementing the selected potential action via an actuator performing the operation on the identified object.

DETAILED DESCRIPTION

Figure 1:
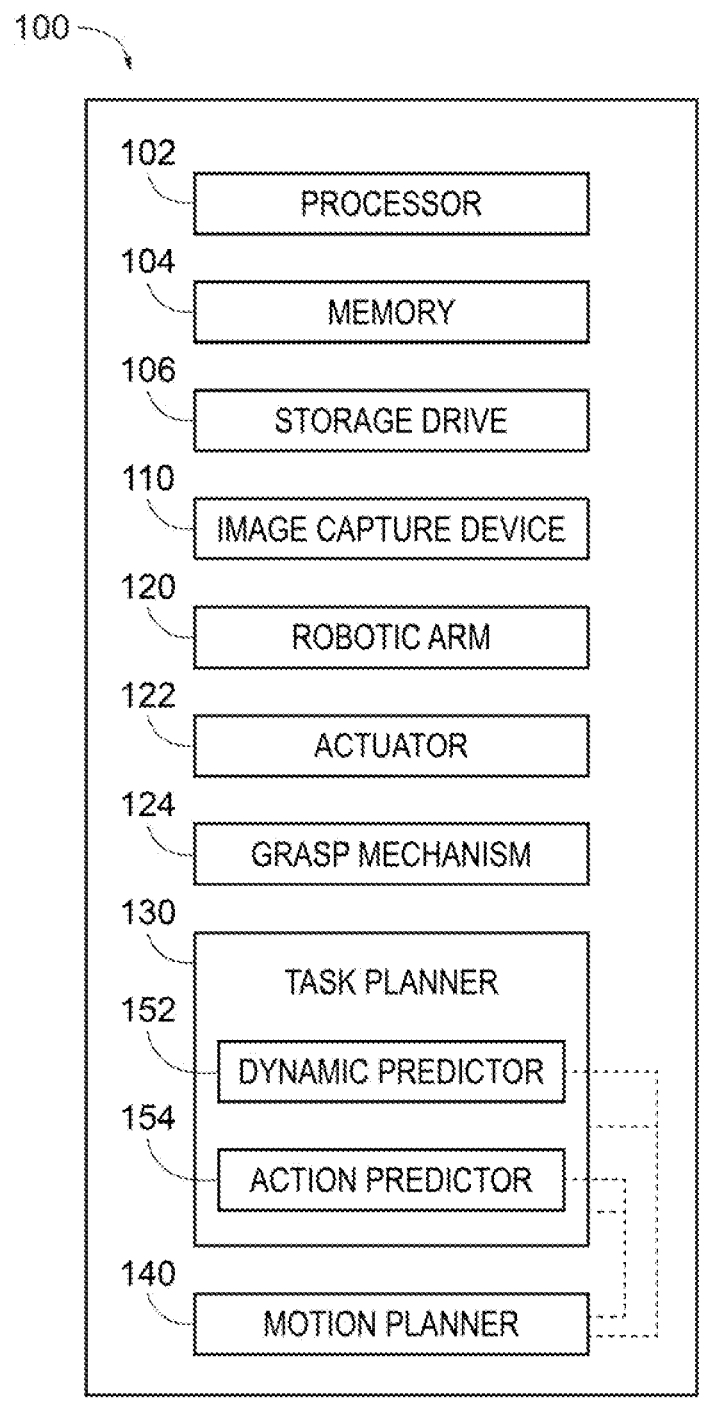
FIG. 1 is a component diagram of a system for target object retrieval, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is a component diagram of a system 100 for target object retrieval, according to one aspect. The system 100 for target object retrieval may include a processor 102, a memory 104, a storage drive 106, an image capture device 110, and a robotic arm 120. The robotic arm 120 may include an actuator 122 and a grasp mechanism 124. The system 100 for target object retrieval may include the task planner 130 and a motion planner 140, which may work in conjunction to provide target object retrieval. The system 100 for target object retrieval may include a dynamic predictor 152 and an action predictor 154.

One or more of the components of the system 100 for target object retrieval may be implemented via the processor 102, the memory, the storage drive, etc. For example, the task planner 130, the motion planner 140, the dynamic predictor 152, and the action predictor 154 may be implemented via the processor 102, the memory, the storage drive, etc.

The image capture device 110 may receive an image of an environment including one or more identified objects and the processor 102 may identify the one or more objects from the image capture device 110.

The task planner 130 may determine one or more potential actions, calculate a probability of success of achieving a desired goal for each of the one or more potential actions based on an action prediction model, the corresponding potential action, a current state of the environment, any previously taken action, and the desired goal, select a potential action associated with the highest calculated probability of success, and simulate a subsequent state based on the selected potential action and a dynamic prediction model.

The task planner 130 may perform feasibility checking on the one or more potential actions based on the current state of the environment. The task planner 130 may also perform difference checking between the subsequent state of the environment and the current state of the environment. The task planner 130 may simulate the subsequent state based on the previously taken action.

The motion planner 140 may implementing the selected potential action and the actuator 122 performing the operation on the identified object using the grasping mechanism.

Figure 2:
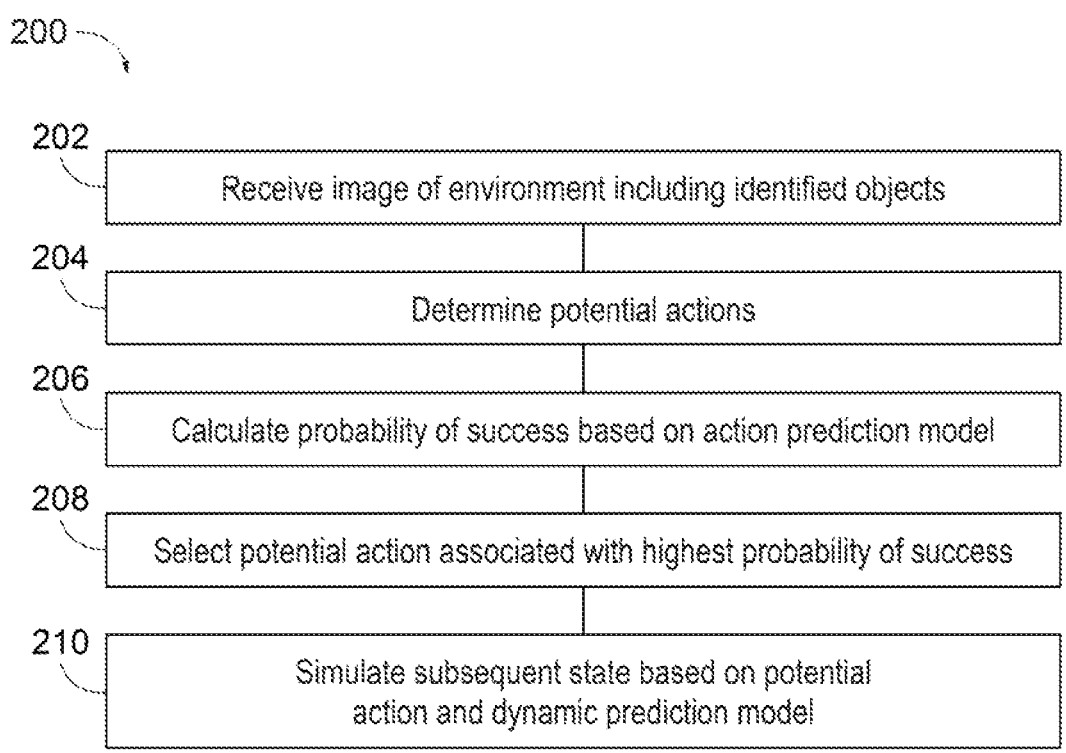
FIG. 2 is a flow diagram of a method for target object retrieval, according to one aspect.

FIG. 2 is a flow diagram of a method 200 for target object retrieval, according to one aspect. The method 200 for target object retrieval may include receiving 202, via the image capture device 110, an image of an environment including one or more identified objects, determining 204, via the processor 102, one or more potential actions, calculating 206, via the processor 102, a probability of success of achieving a desired goal for each of the one or more potential actions based on an action prediction model, the corresponding potential action, a current state of the environment, any previously taken action, and the desired goal, selecting 208, via the processor 102, a potential action associated with the highest calculated probability of success, and simulating 210, via the processor 102, a subsequent state based on the selected potential action and a dynamic prediction model. One or more of the potential actions may be associated with an identified object of the one or more identified objects and an operation to be performed on the identified object.

According to one aspect, the system 100 for target object retrieval may provide target object retrieval within an environment and using integrated task and motion planning. The integrated task and motion planning enables the system 100 for target object retrieval, which may include a robot or be a robot for target object retrieval, to operate in a clustered environment, such as a warehouse or a home. The integrated task and motion planning of the system 100 for target object retrieval may introduce robot autonomy into the system 100 for target object retrieval to facilitate human assistance and complete desired tasks more efficiently. Specifically, the integrated task and motion planning enables the system 100 for target object retrieval to solve the multiple steps or a task that require multiple steps in reasoning in the clustered environment by interfacing the task planner 130 and the motion planner 140.

Many animal species have demonstrated remarkable abilities to perform multi-step tasks. Nonetheless, the ability to solve multi-step manipulation tasks remains an open challenge for today's robotic research. The challenge involves high-level reasoning about what are the desired states to reach, as well as low-level reasoning about how to execute actions to arrive at these states. Thus, the system may generate a high-level plan which describes desired effects during task execution, and also produce feasible actions under physical and semantic constraints of the environment.

Due to the high combinatorial complexity of possible discrete action sequences, a large number of motion planning problems may be solved to find a solution to the task and motion planning (TAMP) problem. This is mainly caused by the fact that many TAMP problems are difficult, since the majority of action sequences may be infeasible, due to kinematic limits or geometric constraints. Consequently, sequential manipulation problems, which intuitively seem simple, may take a very long time to solve. To overcome this combinatorial complexity, the system may aim to learn to predict promising action sequences, such as at the task level. Using this prediction as a heuristic on the symbolic level may drastically reduce the number of motion planning problems to be evaluated. The high level task planner 130 may predict a place location for a grasped object, for example.

Different scenarios may be envisioned in association with the system 100 for target object retrieval. For example, the system may grasp a target object on a cluttered tabletop, and place it in a goal position. As another example, the system may grasp a target object on a cluttered tabletop, and place it in an occupied position (e.g., and clear the occupied position). As yet another example, the system may grasp a target object on a cluttered tabletop, and place it in an occupied position with cluttered surroundings. Further, the system may assemble an assembly from one or more objects.

According to one aspect, the system 100 for target object retrieval may determine an interdependence between a motion level (e.g., low level) and a task level (e.g., high level). A task level may include one or more motion levels. Systems and methods for target object retrieval using integrated task and motion planning may plan under a hidden state space, learn a dynamic prediction model T using the dynamic predictor 152, learn an action prediction model P using the action predictor 154, and provide visual reconstruction as an interaction interface between the task planner 130 and the motion planner 140. The dynamic prediction model T may simulate a scenario prior to implementing a proposed action via the motion planner 140. The action prediction model P may select a proposed action based on a likelihood or a probability that the proposed action (e.g., from a set of potential actions) is the most likely to facilitate achievement of a predetermined goal. The visual reconstruction may be provided between the task planner 130 and the motion planner 140 so that task planning and motion planning are connected in a manner where each understands what the other is doing.

According to one aspect, integrated task and motion planning may be provided via the task planner 130 and the motion planner 140. The task planner 130 may include the action predictor 154 and the dynamic predictor 152. The action predictor 154 may select a proposed action from a set of potential actions based on a probability that the proposed action has a highest likelihood of achieving a predetermined goal. The dynamic predictor 152 may simulate a scenario where the proposed action is implemented. The motion planner 140 may implement the proposed action. A difference checker may check a state prior to implementation of the proposed action against a state after the proposed action is implemented via the motion planner 140 to determine the likelihood of achieving the predetermined goal. Visual reconstruction may be provided between the task planner 130 and the motion planner 140.

As previously discussed, P may be the action prediction model determined via the action predictor 154 and T may be the dynamic prediction model determined via the dynamic predictor 152. h may represent a state in time (e.g., $h_0$=state 0, $h_1$=state 1, $h_2$=state 2, etc.). a may represent a potential action (e.g., $a_0$=action 0, $a_1$=action 1, $a_2$=action 2, etc.). The image capture device 110 may receive an image of a surrounding environment and the processor 102 may identify one or more objects within the environment. According to one aspect, in a scenario where an assembly is to be assembled by the system 100 for target object retrieval, each one of the actions a may correspond, for example, to the grasping of the different objects identified within the environment.

Figure 3:
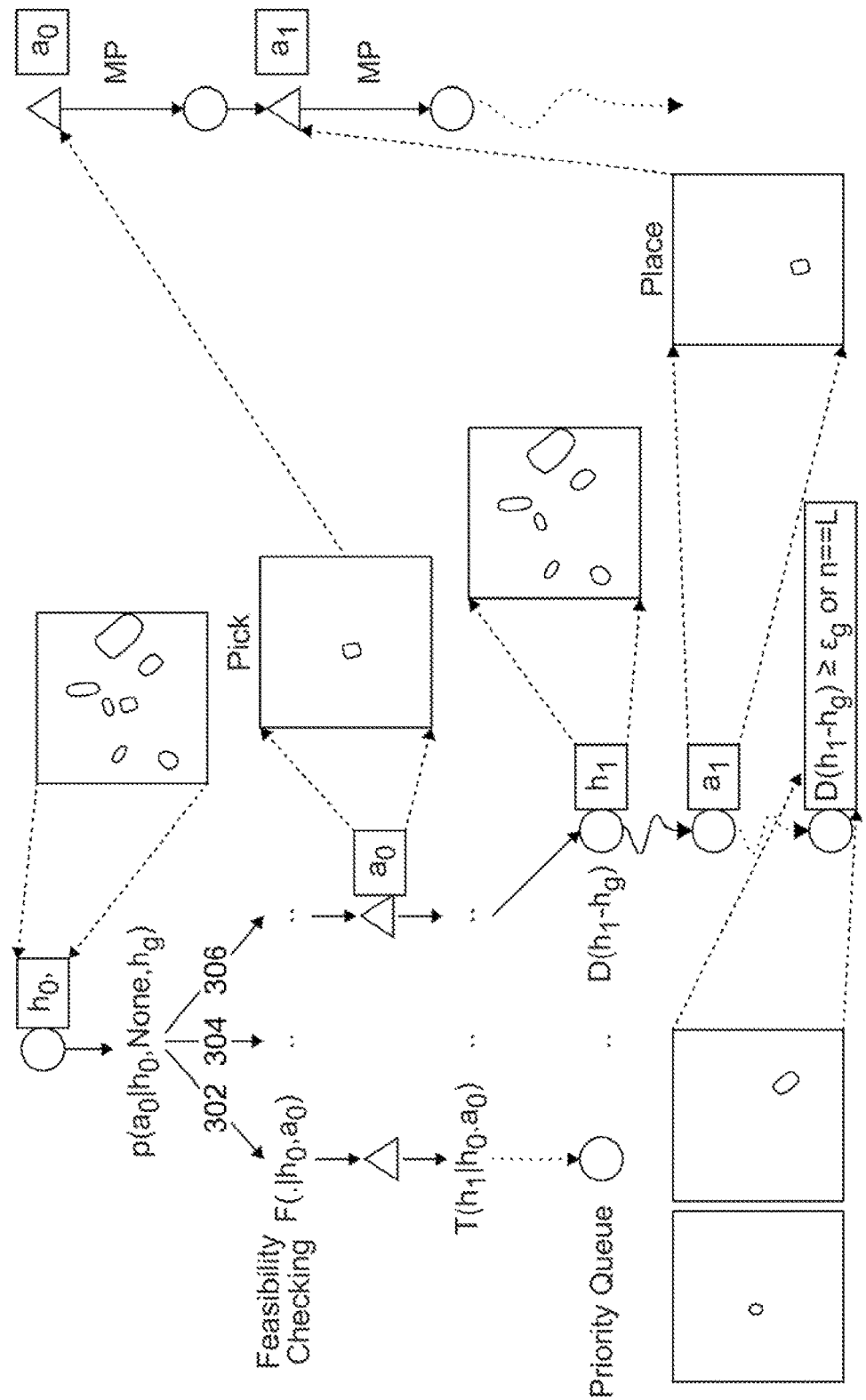
FIG. 3 is a component diagram of a system for target object retrieval, according to one aspect.

In this regard, the task planner 130 may learn to predict promising action sequences. For example, with reference to FIG. 3, each one of the three arrows 302, 304, 306 that branches from $p(a_0|h_0$, none (previous action), $h_g$) may represent a potential action which may be taken by the system 100 for target object retrieval from the initial state $h_0$. FIG. 3 is a component diagram of the system 100 for target object retrieval, according to one aspect where the object retrieval is simulated via the processor 102. Referring back to the example where an assembly is to be assembled, this may mean that there are three objects which are to utilized form the assembly. Although FIG. 3 merely depicts three arrows or potential actions, additional or more complex scenarios are contemplated.

Potential actions may be defined via an operation (e.g., to be taken by the actuator 122 and/or grasp mechanism 124) and an object. For example, an operation space may include, pushing, pulling, grasping, placing, or any number of robotic actions, etc. That is, the operation may include pushing, pulling, grasping, or placing the identified object . . . . Therefore, even if there are merely three objects detected by the image capture device 110, many combinations, and/or permutations of potential actions may exist, depending on the action or operation space of the system 100 for target object retrieval. One or more of the potential actions may be associated with an identified object of the one or more identified objects and an operation to be performed on the identified object.

In FIG. 3, potential actions are represented as triangles while states or scenarios are represented as circles. The state of the environment may include the location or position of objects, the number of objects, and/or the status or characteristics associated with objects (e.g., shape, weight, etc.). Although it may be possible for the task planner 130 to simulate all possible or potential actions, this may be computationally expensive. Therefore, the task planner 130 may predict promising action sequences based on a proposed potential action from the set of potential actions, a current state of the environment, a previously taken action, and a desired goal. This may be represented as $p(a_0|h_0$, one or more previous actions, $h_g$). Promising actions may be potential actions which are determined by the task planner 130 to be associated with a high probability of achieving the desired goal. After the task planner 130 predicts promising action sequences based on the proposed potential action from the set of potential actions, the current state of the environment, the previously taken action, and the desired goal, the motion planner 140 may implement a promising action selected from the promising action sequence based on the likelihood of success of achieving the desired goal. In this way, the task planner 130 of the system 100 for target object retrieval may evaluate each of the potential actions when available (e.g., after the previous action is implemented via the motion planner 140 or at the beginning of a state). Stated another way, the task planner 130 may evaluate the $p(a_0|h_0$, one or more previous actions, $h_g$) at each branch of FIG. 3.

For example, if an object has been removed, where the previous action was to grasp the object from the scene, the system or the robot may be aware that the grasped object is not there, because the object has been grasped. The action prediction model P may determine where to place the grasped object thereby facilitating motion planning. According to one aspect, the action prediction model P may be modeled using a conditional variation auto encoder (CVAE). According to one aspect, the action prediction model P may be modeled or generated based on causal distribution.

In this way, the action prediction model P may provide intermediate visual reconstruction and act as a learning model to tell the system where to place an object once that object is grasped. Stated another way, the action prediction model P may perform reconstruction of a scenario for motion planning during task planning because the motion planning may be foreseen during the task planning via the reconstruction. Therefore, the task planner 130 may determine where to place an object rather than the motion planner 140. In this way, the selected potential action may include a location for the identified object to be placed.

Figure 6:
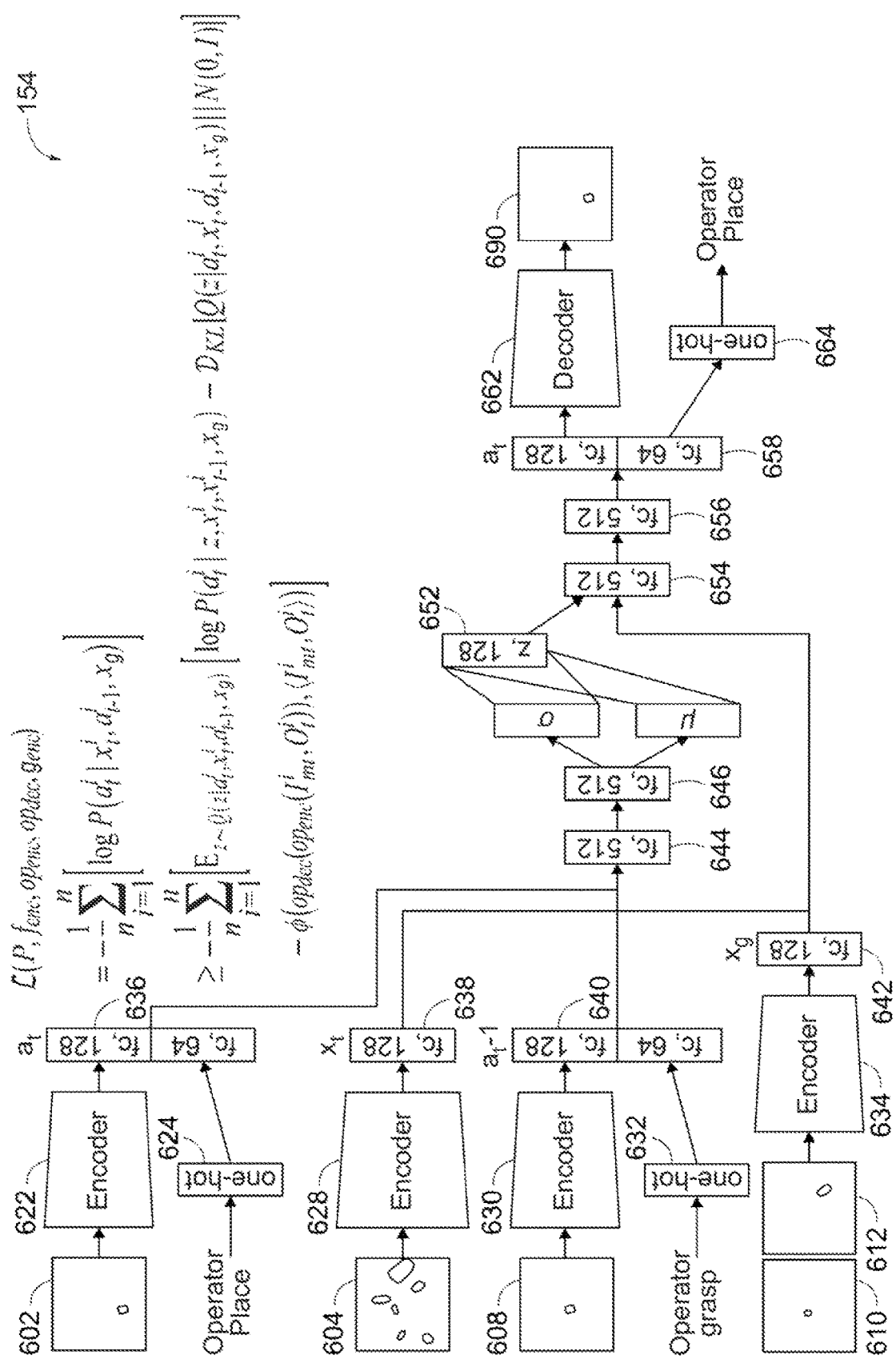
FIG. 6 is a component diagram of a system for target object retrieval, according to one aspect.

An exemplary action predictor 154 architecture training the action predictor 154 to determine the action prediction model P is described herein with respect to FIG. 6. Additionally, the task planner 130 may perform feasibility checking for each of the potential actions. The feasibility checking may be expressed as $F(.|h_i,a_i)$. For example, if two objects are too close, the feasibility checking may indicate that one of the objects may not be picked up until the other object is moved aside.

In FIG. 3, the space on the left hand side of the figure represents an imaginary or planning state (e.g., task planning) while the space on the right hand side of the figure represents a real world or physical state (e.g. motion planning). A natural mixed action following $a_0$ is where to place the object. Thus, the next action $a_1$ may be to place the object. The robot or the system may simulate the next situation to determine a state of action $a_1$. In other words, the future situation may be stimulated, given an action. Additionally, the next action may be determined by simulating the next situation or scenario. Stated another way, the dynamic predictor 152 or the task planner 130 may simulate the next situation to determine a state of the action using the dynamic prediction model T. In other words, when the motion planner 140 executes an action, the next scenario or situation may be observed. Explained again, whenever the system executes an action, the system may call the dynamic prediction model T to determine a simulated representation of a scene if a proposed action is performed. T may be expressed as $T(h_i|h_{i-1}, a_{i-1})$. An exemplary dynamic predictor 152 architecture training the dynamic predictor 152 to determine the dynamic prediction model T is described herein with respect to FIG. 5. The robot or the system may be commanded by the motion planner 140 to execute the next action $a_1$.

Additionally, the task planner 130 may perform difference checking between a current state $h_{i-1}$ and a proposed state $h_i$, the difference checking may be expressed as $D(h_i-h_g)$, and may represent the 'distance' to the desired or predetermined goal.

Figure 4:
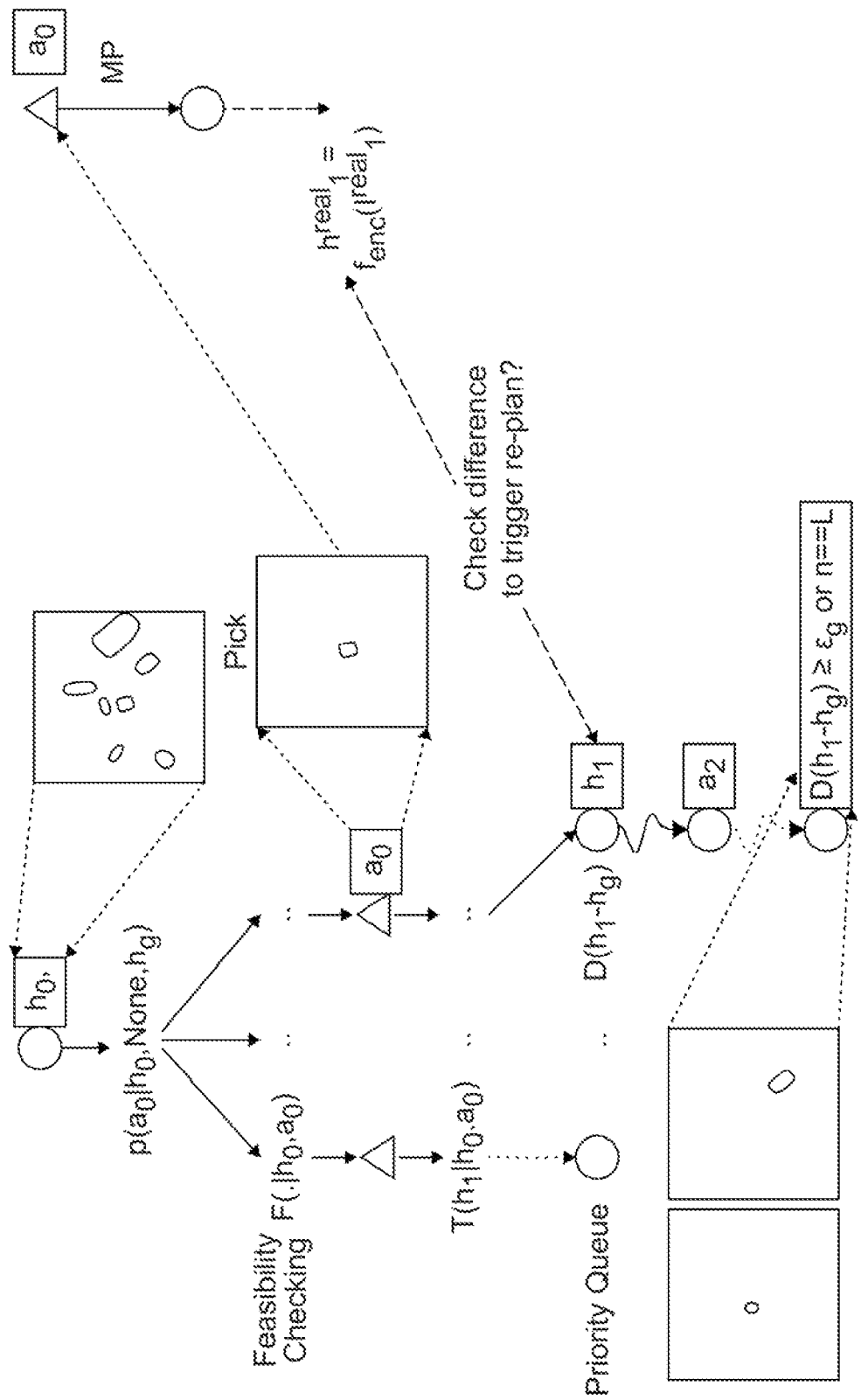
FIG. 4 is a component diagram of a system for target object retrieval, according to one aspect.

FIG. 4 is a component diagram of the system 100 for target object retrieval, according to one aspect. According to one aspect, the system may replan via hidden states difference checking, expressed as $h_1^{real}=f_{enc}(I_1^{real})$, which may be utilized to check differences to trigger the replan.

Figure 5:
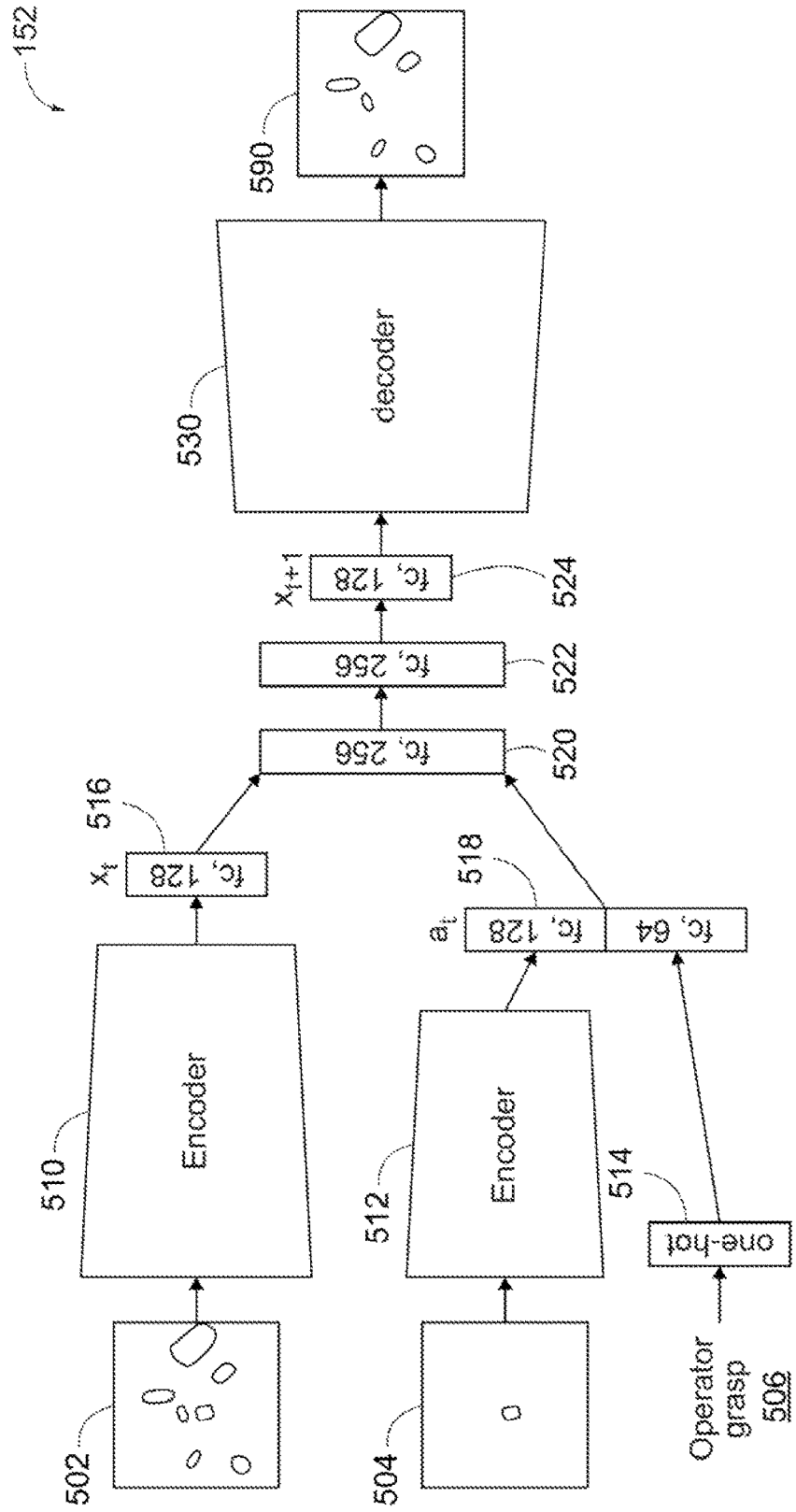
FIG. 5 is a component diagram of a system for target object retrieval, according to one aspect.

FIG. 5 is a component diagram of the system 100 for target object retrieval, according to one aspect. In FIG. 5, an architecture of the dynamic predictor 152 is depicted. The dynamic predictor 152 may include a first encoder 510, a second encoder 512, one or more fully connected layers 516, 518, 520, 522, 524, etc., one or more one-hot layers 514, and a decoder 530. The first encoder may receive an image with objects 502. The second encoder may receive an image with the object to be manipulated 504. The one-hot layer may receive the action to be executed 506. The dynamic predictor 152 may be based on $$\mathcal{L}(T, f_{enc}, f_{dec}, op_{enc}) = -\frac{1}{n}\sum_{i=1}^{n}[\log P(x_{t+1}^i \mid x_t^i, a_t^i)] =$$

$$-\frac{1}{n}\sum_{i=1}^{n}[\log P(f_{enc}(I_t^i), op_{enc}(I_{mt}^i, O_t^i)) - \phi(f_{dec}(f_{enc}(I_{t+1}^i)), I_{t+1}^i)]$$

to produce output 590.

FIG. 6 is a component diagram of the system 100 for target object retrieval, according to one aspect. In FIG. 6, an architecture of the action predictor 154 is depicted. The action predictor 154 may include a first encoder 622 receiving an image 602 that demonstrates where the object is placed by experts, a second encoder 628 receiving an image 604 generated by the dynamic prediction model T, a one-hot layer 632 receiving the previous action (e.g., operator grasp), and a third encoder 630 receiving the corresponding object 608 manipulated in the previous step. The previous action may be fed to the one-hot layer 632. The output of the first encoder 622 may be fed to a first fully connected layer 636, the output of the second encoder 628 may be fed to a second fully connected layer 638, the output of the third encoder 630 may be fed to a third fully connected layer 640. A fourth encoder 634 may receive the image 610 and the desired goal 612 and feed the output to a fully connected layer 642. These first, second, third, and fourth fully connected layers 636, 638, 640, 642 may be fed to a module including a series of layers, such as a set of fully connected layers 644, 646, 652, 654, 656, 658, a μ layer, a σ layer, etc. The output of the module may be fed to a decoder 662 and a one-hot layer 664 to produce an image 690 that shows the location where the object may be placed. The action predictor 154 may be based on $$\mathcal{L}(P, f_{enc}, op_{enc}, op_{dec}, g_{enc}) = -\frac{1}{n}\sum_{i=1}^{n}[\log P(a_t^i \mid x_t^i, a_{t-1}^i, x_g)] \geq$$

$$-\frac{1}{n}\sum_{i=1}^{n}\Big[\mathbb{E}_{z \sim Q(z\mid a_t^i, x_t^i, a_{t-1}^i, x_g)}[\log P(a_t^i \mid z, x_t^i, a_{t-1}^i, x_g) -$$

$$\mathcal{D}_{KL}[Q(z\mid a_t^i, x_t^i, a_{t-1}^i, x_g) \mid\mid \mathcal{N}(0, I)]] -$$

$$\phi(op_{dec}(op_{enc}(I_{mt}^i, O_t^i)), \langle I_{mt}^i, O_t^i\rangle)\Big]$$

to produce output image 690.

Figure 7:
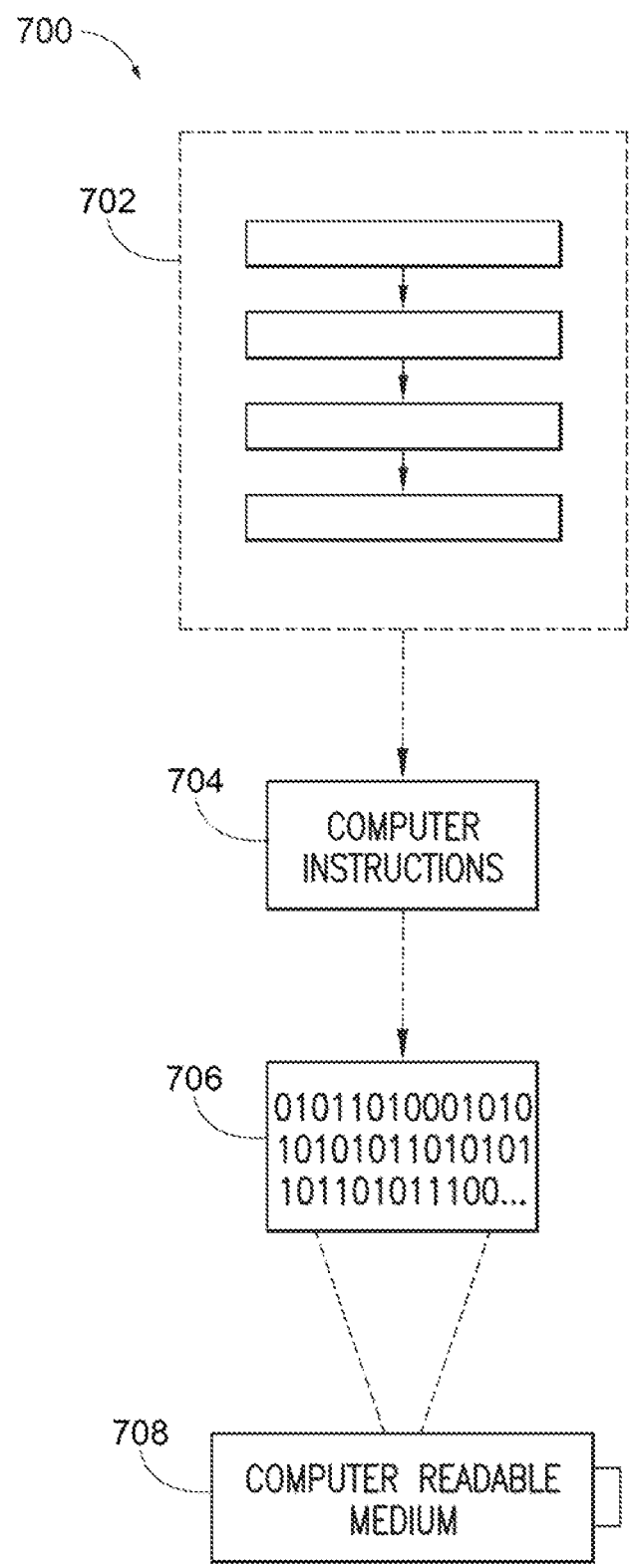
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein. In this implementation 700, the processor-executable computer instructions 704 may be configured to perform a method 702, such as the method 200 of FIG. 2. In another aspect, the processor-executable computer instructions 704 may be configured to implement a system, such as the system 100 of FIG. 1 and FIGS. 3-6. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
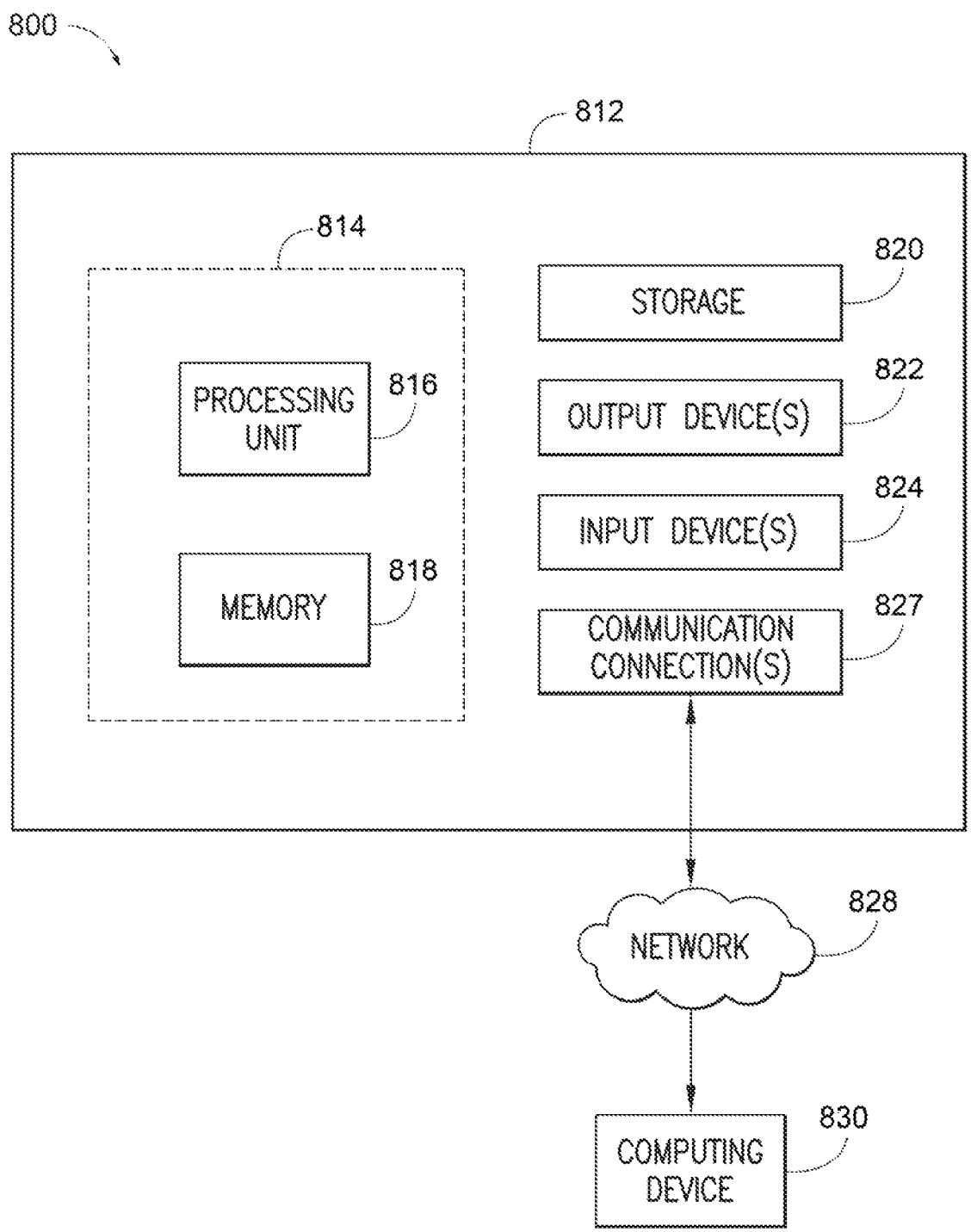
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one aspect provided herein. In one configuration, the computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the computing device 812 includes additional features or functionality. For example, the computing device 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 812. Any such computer storage media is part of the computing device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 812 includes input device(s) 824 such as keyboard, mouse, pen, voice input device, touch input device, infrared cameras, video input devices, or any other input device. Output device(s) 822 such as one or more displays, speakers, printers, or any other output device may be included with the computing device 812. Input device(s) 824 and output device(s) 822 may be connected to the computing device 812 via a wired connection, wireless connection, or any combination thereof. In one aspect, an input device or an output device from another computing device may be used as input device(s) 824 or output device(s) 822 for the computing device 812. The computing device 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for target object retrieval, comprising:
an image capture device receiving an image of an environment including one or more identified objects;
a task planner, implemented via a processor:
determining one or more potential actions, wherein one or more of the potential actions is associated with an identified object of the one or more identified objects and an operation to be performed on the identified object;
calculating a probability of success of achieving a desired goal for each of the one or more potential actions based on an action prediction model, the corresponding potential action, a current state of the environment, any previously taken action, and the desired goal;
selecting a potential action associated with the highest calculated probability of success; and
simulating a subsequent state based on the selected potential action and a dynamic prediction model, wherein the dynamic prediction model is determined using an architecture having a first encoder receiving the image of the environment including the one or more identified objects and a second encoder receiving an image with the identified object;
a motion planner implementing the selected potential action; and
an actuator performing the operation on the identified object.

2. The system for target object retrieval of claim 1, wherein the task planner performs feasibility checking on the one or more potential actions based on the current state of the environment.

3. The system for target object retrieval of claim 1, wherein the task planner performs difference checking between the subsequent state of the environment and the current state of the environment.

4. The system for target object retrieval of claim 1, wherein the operation includes pushing, pulling, grasping, or placing the identified object.

5. The system for target object retrieval of claim 1, wherein the task planner simulates the subsequent state based on the previously taken action.

6. The system for target object retrieval of claim 1, wherein the action prediction model includes a conditional variation auto encoder (CVAE).

7. The system for target object retrieval of claim 1, wherein the action prediction model is generated based on a causal distribution.

8. The system for target object retrieval of claim 1, wherein the selected potential action includes a location for the identified object to be placed.

9. The system for target object retrieval of claim 1, wherein the processor identifies the one or more objects from the image capture device.

10. A robot for target object retrieval, comprising:
an image capture device receiving an image of an environment including one or more identified objects;
a task planner, implemented via a processor:
determining one or more potential actions, wherein one or more of the potential actions is associated with an identified object of the one or more identified objects and an operation to be performed on the identified object;
calculating a probability of success of achieving a desired goal for each of the one or more potential actions based on an action prediction model, the corresponding potential action, a current state of the environment, any previously taken action, and the desired goal;
selecting a potential action associated with the highest calculated probability of success; and
simulating a subsequent state based on the selected potential action and a dynamic prediction model, wherein the dynamic prediction model is determined using an architecture having a first encoder receiving the image of the environment including the one or more identified objects and a second encoder receiving an image with the identified object;
a motion planner implementing the selected potential action; and
an actuator performing the operation on the identified object.

11. The robot for target object retrieval of claim 10, wherein the task planner performs feasibility checking on the one or more potential actions based on the current state of the environment.

12. The robot for target object retrieval of claim 10, wherein the task planner performs difference checking between the subsequent state of the environment and the current state of the environment.

13. The robot for target object retrieval of claim 10, wherein the task planner simulates the subsequent state based on the previously taken action.

14. The robot for target object retrieval of claim 10, wherein the action prediction model includes a conditional variation auto encoder (CVAE).

15. The robot for target object retrieval of claim 10, wherein the action prediction model is generated based on a causal distribution.

16. A method for target object retrieval, comprising:
receiving, via an image capture device, an image of an environment including one or more identified objects;
determining, via a processor, one or more potential actions, wherein one or more of the potential actions is associated with an identified object of the one or more identified objects and an operation to be performed on the identified object;
calculating, via the processor, a probability of success of achieving a desired goal for each of the one or more potential actions based on an action prediction model, the corresponding potential action, a current state of the environment, any previously taken action, and the desired goal;
selecting, via the processor, a potential action associated with the highest calculated probability of success;
simulating, via the processor, a subsequent state based on the selected potential action and a dynamic prediction model, wherein the dynamic prediction model is determined using an architecture having a first encoder receiving the image of the environment including the one or more identified objects and a second encoder receiving an image with the identified object; and
implementing the selected potential action and performing, via an actuator, the operation on the identified object.

17. The method for target object retrieval of claim 16, comprising performing feasibility checking on the one or more potential actions based on the current state of the environment.

18. The method for target object retrieval of claim 16, comprising performing difference checking between the subsequent state of the environment and the current state of the environment.

19. The method for target object retrieval of claim 16, comprising implementing the selected potential action via an actuator performing the operation on the identified object.

* * * * *